United States Patent [19]

Chihaya

[11] Patent Number: 5,094,476
[45] Date of Patent: Mar. 10, 1992

[54] AIRBAG RESTRAINT SYSTEM

[75] Inventor: Masayoshi Chihaya, Kanagawa, Japan

[73] Assignee: Ikeda Bussan Co., Ltd., Ayase, Japan

[21] Appl. No.: 599,459

[22] Filed: Oct. 18, 1990

[30] Foreign Application Priority Data

Oct. 23, 1989 [JP] Japan ................................ 1-275525

[51] Int. Cl.$^5$ ............................................ B60R 21/20
[52] U.S. Cl. ................................... 280/743; 280/731; 280/732
[58] Field of Search ............... 280/743, 728, 736, 738, 280/730, 731, 732

[56] References Cited

U.S. PATENT DOCUMENTS

| 3,810,654 | 5/1974 | Debano, Jr. et al. ................ 280/743 |
| 4,842,300 | 6/1989 | Ziomek et al. ...................... 280/743 |
| 4,944,529 | 7/1990 | Backhaus ............................ 280/743 |

FOREIGN PATENT DOCUMENTS

| 2160959 | 6/1972 | Fed. Rep. of Germany ...... 280/743 |
| 3818185 | 8/1989 | Fed. Rep. of Germany ...... 280/743 |
| 1455482 | 11/1976 | United Kingdom ................ 280/738 |

Primary Examiner—Kenneth R. Rice
Attorney, Agent, or Firm—Foley & Lardner

[57] ABSTRACT

An airbag restraint system for an automotive vehicle is comprised of an airbag to provide a soft cushion for a human body in the event of a serious collision. The airbag is formed of a band-shaped main sheet member which has opposite end portions. The opposite end portions are put one upon another and sewed together, interposing a sheet material therebetween, thereby to form a rigid installation section through which the airbag is installed to a stationary member of the vehicle. The band-shaped main sheet member is formed into the generally cylindrical shape to have opposite open ends. The opposite open ends are sealingly closed respectively with a pair of side sheet members thereby to form a bag-shaped section.

8 Claims, 2 Drawing Sheets

FIG.1
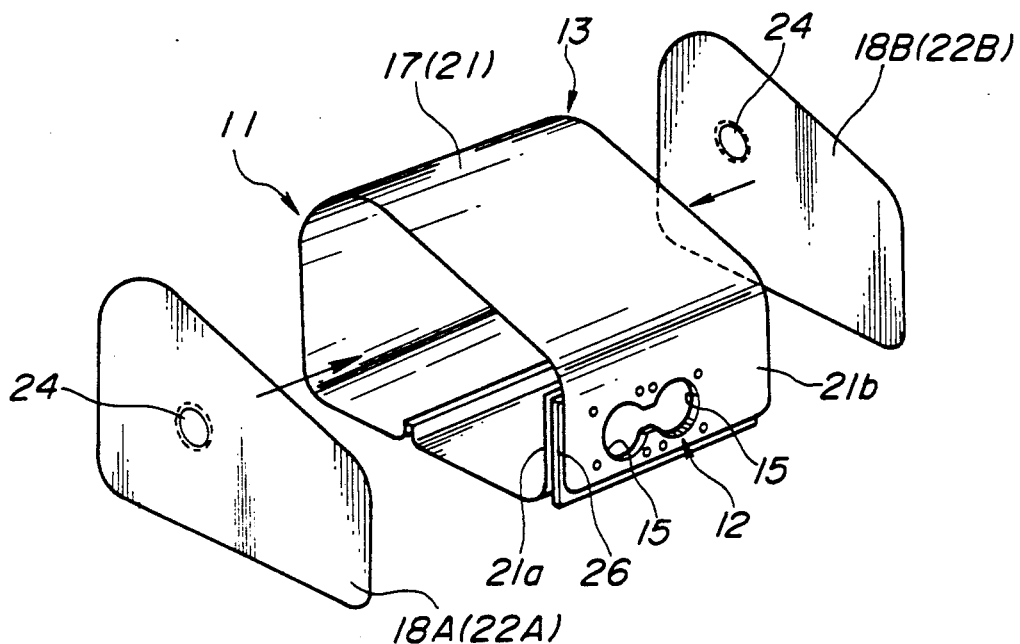
FIG.2      FIG.3      FIG.4
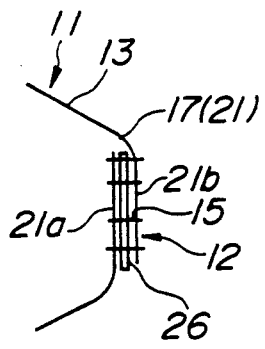 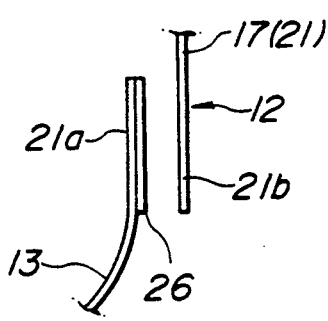 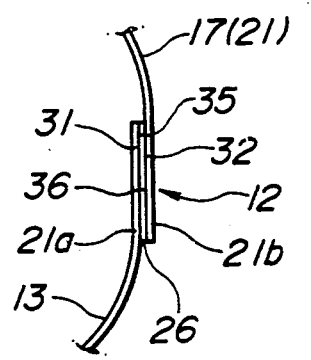

AIRBAG RESTRAINT SYSTEM

BACKGROUND OF THE INVENTION

1. Field of the Invention

This invention relates to improvements in an airbag restraint system, and more particularly to a structure of an airbag to be inflated under the action of gas generated from a gas generator.

2. Description of the Prior Art

It is well known that many automotive vehicles are equipped with an airbag restraint system to protect a passenger from impact during a vehicle collision. Such an airbag restraint system is disclosed, for example, in Japanese Patent Publication No. 56-43890 and Japanese Utility Model Provisional Publication No. 61-185642.

An example of such an airbag restraint system will be discussed with reference to FIGS. 5 and 6 of the present application. The airbag restraint system includes an airbag 1 which is supplied with gas to be inflated. The airbag 1 includes an installation section 2 which is formed with a gas inlet 5 through which a gas from a gas generator is supplied. A bag-shaped section 3 is sewed to the outer peripheral portion of the installation section 2. The installation section 2 of the airbag 1 is fixed to a base plate which is secured to a vehicle stationary side such as an instrument panel or a steering wheel. The gas generator is fixed to the base plate and adapted to be operated under a predetermined condition thereby to momentarily generate gas to be ejected into the airbag 1 so that the airbag 1 is instantly inflated.

During such an operation of the airbag restraint system, a high load is unavoidably applied to the installation section 2, so that there is a possibility of causing accidents such as the installation section 2 being disconnected from the base plate and/or being broken. In this regard, it has been proposed to form the installation section by piling up and sewing four sheet materials 6, 7, 8 and 9 together.

However, difficulties have been encountered in such a conventional airbag installation section 2 which is formed as follows: The four sheet materials 6, 7, 8 and 9 are formed separately. Then, the four sheet materials 6, 7, 8 and 9 are piled up and sewed together. Finally, a bag-shaped section 3 is sewed to the installation section 2. Thus, many sewing steps are required, in which sewing operation of the bag-shaped section 3 to the installation section 2 is particularly troublesome. This degrades the operational efficiency of producing the airbag and in assembling the airbag restraint system. Additionally, a plurality of sheet materials 6, 7, 8 and 9 are required thereby increasing the number of constituent parts.

SUMMARY OF THE INVENTION

It is an object of the present invention to provide an improved airbag restraint system which is easy to produce, highly durable and cost efficient.

Another object of the present invention is to provide an improved airbag restraint system having an airbag which is easy to sew while requiring a small number of constituent parts.

A further object of the present invention is to provide an improved airbag restraint system in which an installation section of an airbag is formed by putting opposite end portions of a band-shaped main sheet member (as a main constituent part of the airbag) one upon another and then by fixing them with each other.

An airbag restraint system according to the present invention is mounted on a vehicle and comprised of an airbag which includes a band-shaped main sheet member which has first and second end portions. The first and second end portions are securely connected with each other so that the main sheet member is formed generally cylindrical to have first and second opposite open ends. First and second side sheet members are securely connected respectively with the first and second opposite open ends to form a bag-shaped section which defines thereinside a gas chamber to be supplied with gas from a gas generator. The first and second end portions of the main sheet member are put one upon another and fixedly joined with each other to form an installation section to be fixed to a side at which a gas generator is disposed. The installation section is formed with a gas inlet through which the gas from the gas generator is supplied into the gas chamber of the bag-shaped section.

Accordingly, the installation section of the airbag is formed by putting the opposite end portions of the band-shaped main sheet member one upon another and by fixedly joining them with each other. This omits a production step to sew a bag-shaped section and an installation section which are formed separately as in conventional arrangements. Additionally, parts of the main sheet member constitute the installation section, and therefore the number of sheet materials for the installation section are reduced. Thus, the number of constituent parts of the airbag is reduced while facilitating sewing operation of the airbag. Furthermore, since the bag-shaped section and the installation section are integral with each other, a connection strength therebetween is greater than that in case they are sewed together after being separately formed as in the conventional arrangements. Thus, the present invention provides an airbag restraint system which is excellent in durability and cost effective from an economical viewpoint.

BRIEF DESCRIPTION OF THE DRAWINGS

In the drawings, the same reference numerals will be used to designate the same elements and parts throughout all the figures:

FIG. 1 is an exploded perspective view of an airbag of an embodiment of an airbag restraint system according to the present invention;

FIG. 2 is a schematic sectional view of an essential part of the airbag in FIG. 1;

FIG. 3 is a sectional view similar to FIG. 2 but showing an essential part of an airbag of another embodiment of the airbag restraint system according to the present invention;

FIG. 4 is a sectional view similar to FIG. 2 but showing an essential part of an airbag of a further embodiment of the airbag restraint system according to the present invention;

DETAILED DESCRIPTION OF THE INVENTION

Figure 5:
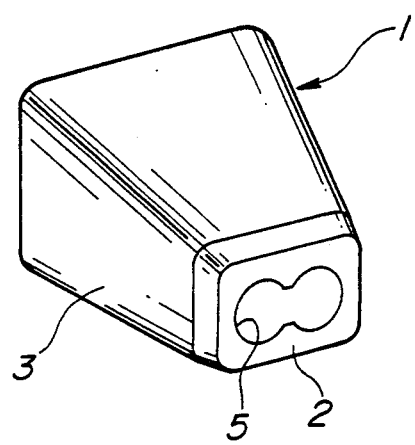
FIG. 5 is a perspective view of a conventional airbag of an airbag restraint system.
Figure 6:
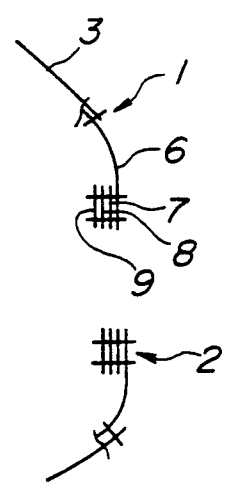
FIG. 6 is a sectional view of an essential part of the conventional airbag restraint system of FIG. 5.

Referring now to FIGS. 1 and 2, there is shown an airbag 11 of a first embodiment of an airbag restraint system in accordance with the present invention. The airbag restraint system is for an automotive vehicle, so that the airbag 11 is designed to inflate in order to provide a soft cushion for a vehicle passenger in the event of a vehicle collision. In this embodiment, the airbag 11 is of a so-called assist-airbag type and installed to a side at which a gas generator (not shown) is disposed. The gas generator is adapted to generate a gas to be supplied into the airbag in the event of a vehicle collision. The airbag 11 includes a bag-shaped section 13 which is inflatable when supplied with gas from the gas generator.

The bag-shaped section 13 is formed of a sheet material which includes a cloth or the like coated with a soft plastic layer. The sheet material may be formed by bonding the cloth or the like and a soft plastic sheet with each other. The bag-shaped section 13 includes a main part 17 formed of a band-shaped main sheet 21 and produced by bending the main sheet 21 at its middle portion. A pair of side parts 18A, 18B are formed of flat side sheets 22A, 22B, respectively, and sealingly connected with the main part 17 thereby to define a gas chamber (not identified) to be supplied with gas from the gas generator. Each flat side sheet 22A, 22B is formed with a gas leak opening 24 through which gas in the gas chamber can leak.

As shown in FIGS. 1 and 2, the bent band-shaped main sheet 21 has opposite end portions 21a, 21b which are put one end portion 21b upon another end portion 21a and fixedly joined with each other, for example, by sewing them together to form an installation section 12 through which the airbag 11 is installed to a base plate (not shown) installed to an instrument panel or a steering wheel though not shown. In this embodiment, a sheet material 26 is interposed between the end portions 21a, 21b. The sheet material 26 includes a cloth or the like whose opposite side surfaces are respectively coated with soft plastic layers. The thus overlapped end portion 21a, sheet material 26 and end portion 21b are fixedly joined with each other by sewing them together as clearly shown in FIG. 2.

The installation section 12 is formed with gas inlets 15, 15 through which the gas from the gas generator is supplied or ejected into the airbag 11. The gas inlets 15, 15 are formed before the end portions 21a, 21b are joined with each other; however, they may be formed by cutting a central portion of the installation section 12 after the end portions 21a, 21b are joined with each other. While the two gas inlets 15, 15 have been shown and described as corresponding to two gas generators (not shown), it will be understood that only one gas inlet may be formed in case of using one gas generator.

As clearly shown in FIG. 1, the band-shaped main sheet 21 is formed into the generally cylindrical shape thereby to form the generally cylindrical main part 17 having opposite open ends (no numerals). The flat side sheets 22A, 22B of the side parts 18A, 18B are sewed respectively with the open ends of the main part 17 to maintain a gas-tight seal. More specifically, the peripheral portion of each flat side sheet 22A, 22B is sewed with the peripheral portion of each open end of the main part 17 (or of the cylindrical band-shaped main sheet 21). It will be seen that the flat side sheet 22A, 22B has a portion sewed with the installation section 12.

FIG. 3 illustrates an essential part of another embodiment of the airbag restraint system according to the present invention, which is similar to that of the embodiment of FIGS. 1 and 2. In this embodiment, the installation section 12 is formed in a manner set forth below. The sheet material 26 whose opposite sides are coated with soft plastic layers is previously sewed onto the end portion 21b of the band-shaped main sheet 21. Then, the end portion 12b is bonded to the sheet material 26 with adhesive or the like. Otherwise, the installation section 12 having a similar structure may be formed by turning up the end portion 21a of the band-shaped main sheet 21 to form a double sheet structure; and then the end portion 21b is sewed onto the double sheet structured end portion 21a. Furthermore, the installation section 12 of the similar structure may be formed by turning up each of the end portions 21a, 21b to form a double sheet structure; and then a pair of the thus double sheet structured end portions 21a, 20b are put one upon another to form a four sheet structure.

FIG. 4 illustrates an essential part of a further embodiment of the airbag restraint system according to the present invention, which is similar to that of the embodiment of FIGS. 1 and 2. In this embodiment, the installation section 12 is formed in a manner set forth below. So-called surface fasteners 31, 32 are sewed respectively onto the end portions 21a, 21b of the band-shaped main sheet 21. Then, other surface fasteners 31, 36 are sewed onto the opposite surfaces of the sheet material 26. The surface fasteners 31, 35 are engaged with each other while the surface fasteners 32, 36 are engaged with each other, thereby forming the installation section 12. What is meant by the "surface fastner" is a fibrous sheet which is engageable with and releasable from a counterpart similar sheet under the action of piles.

What is claimed is:

1. An airbag restraint system for a vehicle comprising:
    an airbag including a band-shaped main sheet member which has first and second end portions, said first and second end portions being securely connected so that said main sheet member is formed generally cylindrical to have opposite first and second open ends, and first and second side sheet members which are securely connected respectively with said first and second open ends to form a bag-shaped section which defines thereinside a gas chamber to be supplied with gas from a gas generator; and
    means for putting the second end portion upon the first end portion of said main sheet member and for securely joining them with each other to form a flat installation section through which the airbag is installed to a base plate to be fixed to a side at which the gas generator is disposed, said installation section being formed with a gas inlet through which the gas from the gas generator is supplied into the gas chamber of said bag-shaped section.

2. An airbag restraint system as claimed in claim 1, wherein said putting and joining means includes means for joining the first and second end portions of said main sheet member by sewing them together upon being put one upon another.

3. An airbag restraint system as claimed in claim 1, further comprising a sheet material which is interposed between the first and second end portions of said main sheet member, said sheet material being securely joined with the first and second end portions.

4. An airbag restraint system as claimed in claim 3, wherein said sheet material includes a base fibrous sheet, and first and second soft plastic layers formed on the opposite surfaces of said base fibrous sheet.

5. An airbag restraint system as claimed in claim 3, wherein said sheet material includes first and second surface fastener members formed on opposite surfaces thereof, in which third and fourth surface fastener members are formed respectively on the main sheet member first and second end portions so as to be opposite to each other, said first and third surface fasteners being engaged with each other, and said second and fourth surface fasteners being engaged with each other.

6. An airbag restraint system as claimed in claim 1, further comprising means for sealingly joining a peripheral portion of said first side sheet member with a peripheral portion of the first open end of said generally cylindrical main sheet member, and for sealingly joining a peripheral portion of said second side sheet member with a peripheral portion of the second open end of said generally cylindrical main sheet member.

7. An airbag restraint system as claimed in claim 6, wherein said sealingly joining means includes means for joining the peripheral portion of said first side sheet member with the peripheral portion of the first open end of the main sheet member by sewing them together, and for joining the peripheral portion of said second side sheet member with the peripheral portion of the second open end of the main sheet member by sewing them together.

8. An airbag restraint system for a vehicle comprising:

an airbag including a band-shaped main sheet member which has first and second end portions, said first and second end portions being securely connected so that said main sheet member is formed generally cylindrical to have opposite first and second open ends, and first and second side sheet members which are securely connected respectively with said first and second open ends to form a bag-shaped section which defines thereinside a gas chamber to be supplied with gas from a gas generator;

means for putting the second end portion upon the first end portion of said main sheet member and for securely joining them with each other to form a flat installation section through which the airbag is installed to a base plate to be fixed to a side at which the gas generator is disposed, said installation section being formed with a gas inlet through which the gas from the gas generator is supplied into the gas chamber of said bag-shaped section;

means for forming flat each of said first and second end portions so that said installation section is flat; and means defining a gas inlet opening in said installation section, the gas from the gas generator being supplied through said gas inlet opening into the gas chamber of said bag-shaped section.

* * * * *